(12) United States Patent
Hsu et al.

(10) Patent No.: US 7,972,689 B2
(45) Date of Patent: Jul. 5, 2011

(54) OPTICAL THIN SHEET

(75) Inventors: Lung-Lin Hsu, Kaohsiung (TW);
Chia-Yi Lu, Kaohsiung (TW);
Yi-Chung Shih, Kaohsiung (TW);
Ming-Tso Chen, Kaohsiung (TW);
Yen-Fu Huang, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 939 days.

(21) Appl. No.: 11/603,759

(22) Filed: Nov. 22, 2006

(65) Prior Publication Data
US 2007/0127127 A1 Jun. 7, 2007

(30) Foreign Application Priority Data

Nov. 23, 2005 (TW) ................................ 94141142 A

(51) Int. Cl.
*B32B 5/16* (2006.01)
*B32B 27/28* (2006.01)
*B32B 27/36* (2006.01)

(52) U.S. Cl. ........ 428/323; 428/327; 428/331; 428/412; 428/447; 428/448; 428/480

(58) Field of Classification Search ................ 428/323, 428/327, 331, 412, 447, 448, 480
See application file for complete search history.

(56) References Cited

U.S. PATENT DOCUMENTS

| 6,680,010 B2 | 1/2004 | Sung et al. |
| 6,844,047 B2 * | 1/2005 | Kaminsky et al. ............ 428/141 |
| 2007/0082218 A1 * | 4/2007 | Chuang et al. ................ 428/629 |
| 2007/0195418 A1 | 8/2007 | Kogure et al. |

FOREIGN PATENT DOCUMENTS

| JP | 07-218705 | * | 8/1995 |
| JP | H07-218705 | | 8/1995 |
| JP | 2001-91707 | | 4/2001 |
| JP | 2002-156510 | | 5/2002 |
| JP | 2002-207103 | | 7/2002 |
| JP | 2004-219668 | | 4/2004 |
| JP | 2005-321681 | | 11/2005 |
| TW | 448315 | | 8/2001 |
| WO | 03/093000 A1 | | 11/2003 |

OTHER PUBLICATIONS

Patent abstracts of Japan English abstract of JP H07-218705.
Patent abstracts of Japan English abstract of JP 2002-207103.
Patent abstracts of Japan English abstract of JP 2001-91707.
Patent abstracts of Japan English abstract of JP 2002-156510.
Patent abstracts of Japan English abstract of JP 2004-219668.

* cited by examiner

*Primary Examiner* — Gwendolyn Blackwell
(74) *Attorney, Agent, or Firm* — Ladas & Parry LLP

(57) ABSTRACT

An optical thin sheet is provided, which comprises a substrate with a light diffusion layer on at least one side of the substrate. The optical thin sheet has an optical property with respect to a haze of no less than 98% and is particularly suitable for use in flat displays.

14 Claims, 2 Drawing Sheets

OPTICAL THIN SHEET

BACKGROUND OF THE INVENTION

1. Field of Invention

The present invention relates to an optical thin sheet used for a backlight element assembled within a liquid crystal display (LCD), which has an optical property of high diffusion, such that the light transmitted there-through is uniformly distributed, thereby achieving a desired optical effect.

2. Description of the Prior Art

Since a liquid crystal panel cannot emit light by itself, a back light acting as a light source is an important element for the displaying function of a LCD and is very important for enhancing the luminance of the LCD.

Moreover, the LCD product has been expanded from LCDs in laptop computers or LCD screens to LCD TVs. Thus, critical factors to be considered are sufficient imaging luminance, broad viewing angle, sharp image contrast, and desired service life. In order to meet the requirements, a direct type backlight has become the mainstream technology used in large LCD TVs. FIG. 1 is a schematic view of a direct type backlight module. Referring to FIG. 1, the direct type backlight module comprises a reflecting film (11), a cold cathode fluorescent lamp (12), a diffuser (13), a diffusion film (14), and a brightness enhancing film (15) sequentially from bottom to top.

Though the direct type backlight module product usually provides a high luminance, bright and dark stripes easily occur due to the increase in the number of the lamps, and thereby the uniformity of light is influenced. Thus, a diffuser must be added when designing the backlight module. The diffuser, with a thickness of about 2 mm, is usually composed of polycarbonate (PC) resin or polymethyl methacrylate (PMMA) resin containing organic or inorganic particles, and has a main function of utilizing the particles to allow the light to be refracted and dispersed when passing through two mediums with different refraction indexes, and to distribute the line light emitted from the light source into a plane light, that is, the light coming from a bottom light source is diffused when transmitting through the diffuser and is uniformly dispersed, and then emitted from a front surface.

Although a flat panel liquid crystal display (LCD) is generally required to be light, thin, short, and small, the diffuser is thick and heavy and the material used in the diffuser will absorb light inevitably, thereby wasting a portion of the light. Thus, the light source cannot be used effectively. Moreover, the manufacturing process of the diffuser is time consuming and involves a relatively high manufacturing cost, which is disadvantageous to the module design.

In order to solve the above problem, through a thorough research, the inventors of the present invention found that, an optical thin sheet with an optical property of high diffusion can be used to replace the diffuser currently used in the backlight module for uniformizing light so as to achieve a uniformity effect, and the optical thin sheet has the advantages of being thin and light, and being able to be produced by a simple process at a high yield, which effectively solve the above problem.

SUMMARY OF THE INVENTION

The main object of the present invention is to provide an optical thin sheet with a haze of no less than 98% as measured in accordance with the JIS K7136 standard method.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

DETAILED DESCRIPTION OF THE INVENTION

Figure 1:
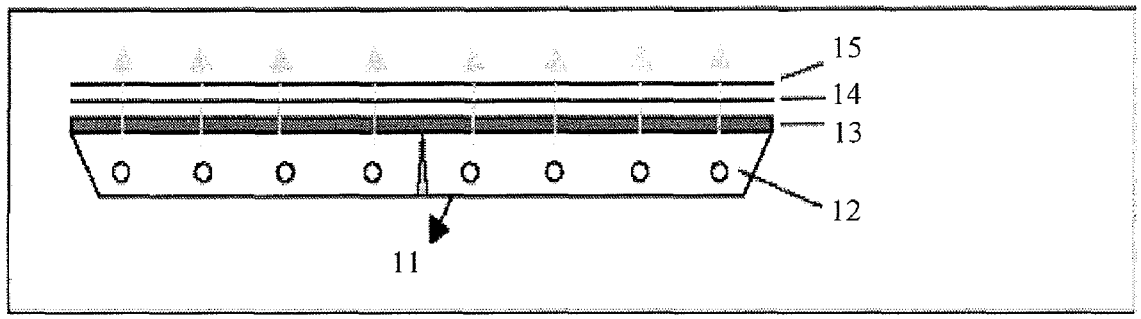
FIG. 1 is a schematic view of a direct type backlight module.

The optical thin sheet of the present invention comprises a substrate with a light diffusion layer on at least one side of the substrate, and has a haze of no less than 98% as measured in accordance with the JIS K7136 standard method.

The substrate used in the optical thin sheet of present invention can be any substrate known to those with ordinary skill in the technical field to which the present invention belongs, such as glass or plastic. The plastic substrate does not require special limitations and can be, for example, polyacrylate resin, polycarbonate resin, polystyrene resin, polyolefin resin, polycyclo-olefin resin, cellulose acetate resin, polyimide resin, or polyester resin, of which the polyester resin is preferred, such as poly(ethylene terephthalate) or poly(ethylene naphthalate). The suitable thickness of the substrate is usually determined according to the requirements of a desired optical product. If the substrate is too thin, it could be easily curled during the coating process; whereas, if the substrate is too thick, the brightness of the substrate will be reduced. Preferably, the thickness of the substrate is between about 16 μm and about 250 μm.

In order to achieve a high light diffusion effect, the substrate is provided with a light diffusion layer on at least one side of the substrate. In other words, a convex-concave structure is formed on the light incident surface, the light emitting surface, or both of the surfaces of the substrate, so as to act as a light diffusion layer. According to ASTM D523 standard method, when the light source projects with an incident angle of 60°, the gloss measured at the light diffusion layer is lower than 10%. The process for forming the convex-concave structure is not particularly limited, and may be any of those well known to those skilled in the art, for example, screen printing, spraying, or embossing. A preferred method is to apply a resin coating layer with a convex-concave structure on the surface of the substrate.

The above resin coating layer comprises particles and a bonding agent. In order to achieve a high diffusion effect, the diameter of the particles is preferably between about 1 μm and 20 μm. The amount of the particles, based on the weight of the bonding agent, preferably is in the range from about 100 weight % to about 600 weight %, and more preferably, ranges from about 150 weight % to about 500 weight %. If the amount of the particles is lower than 100 weight %, based on the weight of the bonding agent, the diffusion effect is not desirable; whereas if the amount of the particles is higher than 600 weight %, the particles are difficult to be fixed into the bonding agent on the surface of the substrate, resulting in the risk of the dropping-out of the particles.

The particles that can be used in the present invention are not particularly limited, which can be organic particles, inorganic particles, or a mixture thereof. The shape of the particles is also not particularly limited, which can be spherical or diamond-shaped.

The organic particles used in the present invention can be selected from the group consisting of acrylic resin, styrene resin, urethane resin, silicone resin, and a mixture thereof.

The inorganic particles used in the present invention can be selected from the group consisting of zinc oxide, titanium dioxide, zirconia, aluminium oxide, zinc sulfide, barium sulfate, and a mixture thereof.

According to an embodiment of the present invention, the above particles are preferably organic particles with a particle size in the range of between about 1 μm and about 10 μm. Preferably, the organic particles are silicone resin particles.

According to a preferred embodiment of present invention, the optical thin sheet of the present invention comprises a plastic substrate having at least one side coated with a resin coating layer with a convex-concave structure, wherein the resin coating layer contains organic particles; the haze of the optical thin sheet is no less than 98% as measured in accordance with the JIS K7136 standard method.

The above bonding agent is not particular limited, which can be, for example, selected from the group consisting of acrylic resin, polyamide resin, epoxy resin, fluoro resin, polyimide resin, polyurethane resin, alkyd resin, polyester resin, and a mixture thereof, of which acrylic resin, polyurethane resin, polyester resin, and a mixture thereof are preferred. The bonding agent used in the present invention preferably is colorless and transparent such that the light can transmit through.

In order to prevent the plastic substrate from yellowing, an inorganic substance capable of absorbing UV light is optionally added to the layer, which is, for example, but is not limited to, zinc oxide, lead oxide, zirconia, aluminium oxide, silicon dioxide, titanium dioxide, calcium sulfate, barium sulphate, calcium carbonate, or a mixture thereof, among which titanium dioxide, zirconia, aluminium oxide, zinc oxide, or a mixture thereof is preferred. The particle size of the above inorganic substance is generally in the range of from about 1 nm to about 100 nm, preferably in the range of from about 20 nm to about 50 nm.

The coating layer with the convex-concave structure used in the optical thin sheet of the present invention may also contain additives known to those skilled in the art, which may be, for example, but are not limited to, a leveling agent, a stabilizing agent, a curing agent, a fluorescent brightness enhancer, or an UV-absorbing agent.

The curing agent that can be used in the present invention to form a crosslinking with the bonding agent through the chemical bonding between the molecules is well known to those skilled in the art, which for example is, but not limited to polyisocyanate.

The fluorescent brightness enhancer that can be used in the present invention is not particularly limited and is obvious to those skilled in the art, which can be an organic substance, including but being not limited to benzoxazoles, benzimidazoles, or diphenylethylene bistriazines; or an inorganic substance, including but being not limited to zinc sulfide.

The UV-absorbing agent that can be used in the present invention is well known to those skilled in the art, examples of which include benzotriazoles, benzotriazines, benzophenones, or salicylic acid derivatives.

According to a preferred embodiment of the present invention, the optical thin sheet of the present invention comprises a polyester resin substrate having at least one side coated with a resin coating layer with a convex-concave structure, wherein the resin coating layer comprises organic particles, a bonding agent, and an inorganic substance, and wherein the organic particles have a diameter in the range from about 1 μm and about 10 μm, and are in an amount ranging from about 100 weight % to about 600 weight %, preferably from 150 weight % to 500 weight %, based on the weight of the bonding agent, and wherein the haze of the optical thin sheet is no less than 99% as measured in accordance with the JIS K7136 standard method. The above inorganic substance is preferably titanium dioxide, zirconia, aluminium oxide, zinc oxide, or a mixture thereof, and preferably, the total light transmittance of the optical thin sheet is no less than 60% as measured in accordance with the JIS K7136 standard method.

The suitable thickness of the resin coating layer used in the optical thin sheet of the present invention generally depends on the requirements of the desired optical products, which is normally between about 1 μm and about 50 μm, preferably between about 1 μm and about 20 μm.

The optical property of an optical product can be directly expressed by the values in terms of the haze (Hz), the total light transmittance (Tt), the diffusion light transmittance (Td), and the parallel light transmittance (Tp), wherein $Tt=Td+Tp$, $Hz=Td/Tt(\%)$. Generally, the total light transmittance indicates the transmittance property of the optical product, and the haze indicates the diffusion property of the optical product. The optical thin sheet of the present invention possesses optical properties of high transmittance and high diffusion. In accordance with the JIS K7136 standard method, the total light transmittance of the optical thin sheet of the present invention is no less than 60%, preferably higher than 80%, and the haze of the optical thin sheet of the present invention is no less than 98%, preferably higher than 99%.

The optical thin sheet of the present invention has optical properties of being high temperature resistant, anti-adhesive, anti-static, and highly hazed, and can be used as a diffusive sheet in a backlight module of a display. Since the optical thin sheet has the property of high diffusion, the light can be uniformly diffused when passing through the optical thin sheet, thereby eliminating the bright and dark stripes and achieving a uniform light effect.

In order to effectively reduce the manufacturing cost of modules and reduce the necessity of utilizing other films (for example, a brightness enhancing film and a diffusion film), the present invention also provides a complex optical thin sheet with the functions of other films, which comprises the optical thin sheet of the present invention, and the other side of the substrate can be optionally in any shape and provided with any function, and for example, can be planar or a matte surface, and can be used for enhancing brightness or dispersing light. For example, a brightness enhancing layer for focusing light may be coated at the opposite side of the substrate, thereby imparting the substrate with the functions of both diffusing light and enhancing brightness, so as to improve the directional property of the emitted light and improve the luminance at the front surface. The above brightness enhancing layer preferably has a microstructure, which may be, for example, but are not limited to being in the form of a regular or irregular prism pattern, rounded prism pattern, solid angle pattern, bead pattern, or lenticular pattern, and the prism pattern is preferred. Alternatively, a diffusion layer with a diffusion function may be coated on the opposite side of the substrate to change the light refraction angle and to increase the brightness. The above diffusion layer may comprise one or more kinds of scattering particles with different diameters ranging from about 1 μm to about 50 μm. The shape of the scattering particles does not require particular limitation, which can be, for example, but is not limited to being spherical or diamond-shaped. The scattering particles can be organic particles, inorganic particles, or a mixture thereof, and the examples of the organic particles and inorganic particles are as those mentioned hereinbefore.

Figure 2:
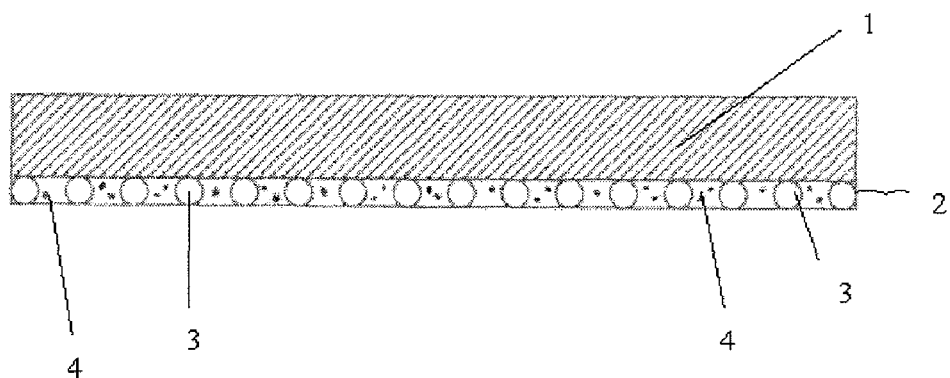
FIG. 2 is a schematic view of an optical thin sheet according to the present invention.
Figure 3:
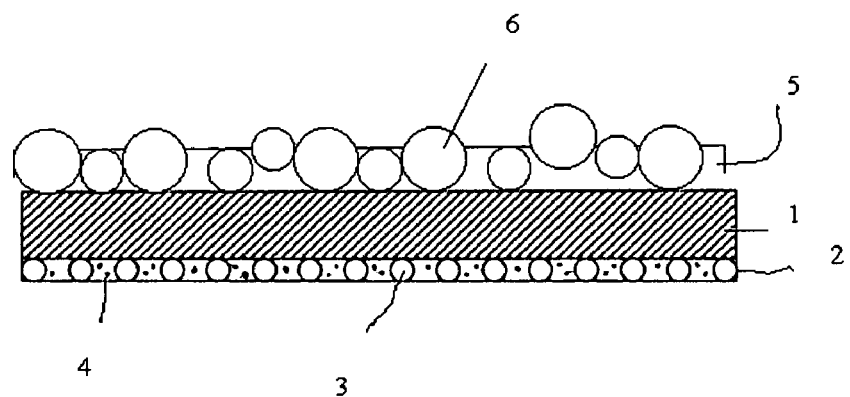
FIG. 3 is a schematic view of a complex optical thin sheet according to the present invention.
Figure 4:
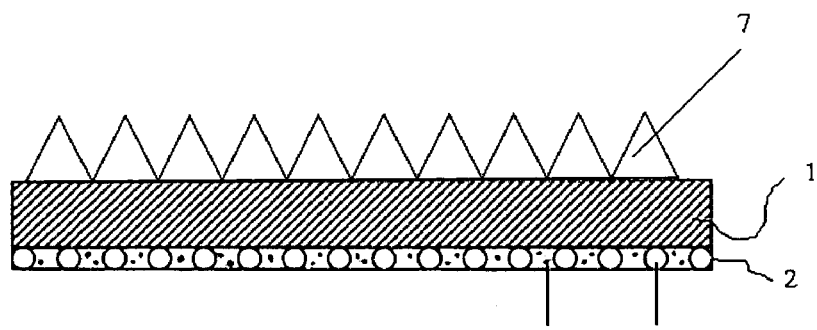
FIG. 4 is a schematic view of another complex optical thin sheet according to the present invention.

According to a preferred embodiment of the present invention, the optical thin sheet of the present invention is shown in FIG. 2, wherein one side of the substrate (1) comprises a light diffusion layer (2) containing particles (3) and an inorganic substance (4). FIG. 3 and FIG. 4 are schematic views of the complex optical thin sheets according to the present invention respectively. As shown in FIG. 3 and FIG. 4, in addition to the optical thin sheet of the present invention, the complex optical thin sheet comprises a diffusion layer (5) containing scattering particles (6), or a brightness enhancing layer (7).

The following examples are intended to further describe the present invention, but not to limit the scope of the present invention. Any modifications and variations easily achieved by those skilled in the art are included in the scope of disclosures of the specification and appended claims.

Example 1-1

21.0 g acrylic resin [Eterac 7363-ts-50, Eternal Company] (with a solids content of about 50%) was added into a plastic bottle. Then, 15.0 g methyl ethyl ketone, 15.0 g toluene, and 24 g silicone resin powder with an average particle size of 2 μm [Tospearl 120E, GE Toshiba Silicones Company] were added sequentially under a high speed stirring. Finally, 2.0 g curing agent [Desmodur 3390, Bayer Company] (with a solids content of about 75%) was added. As such, a coating with a solids content of about 46% and a total weight of about 77.0 g was obtained. The coating was coated on the light incident surface of a PET substrate [T680E100, Mitsubishi Company] by a RDS painting stick #12, and then dried at 120° C. for 1 minute to obtain a coating film of about 7 μm. A transparent material luminance test was performed and the result is shown in Table 1.

Example 1-2

21.0 g acrylic resin [Eterac 7363-ts-50, Eternal Company] (with a solids content of about 50%) was added into a plastic bottle. Then, 18.0 g methyl ethyl ketone, 18.0 g toluene, and 36 g silicone resin powder with an average particle size of 2 μm [Tospearl 120E, GE Toshiba Silicones Company] were added sequentially under a high speed stirring. Finally, 2.0 g curing agent [Desmodur 3390, Bayer Company] (with a solids content of about 75%) was added. As such, a coating with a solids content of about 49% and a total weight of about 95.0 g was obtained. The coating was coated on the light incident surface of a PET substrate [T680E100, Mitsubishi Company] by a RDS painting stick #12, and then dried at 120° C. for 1 minute to obtain a coating film of about 7 μm. A transparent material luminance test was performed and the result is shown in Table 1.

Example 1-3

The coating of Example 1-1 was coated on both surfaces of a PET substrate [T680E100, Mitsubishi Company] by a RDS painting stick #12, and then dried at 120° C. for 1 minute to obtain coating films of a total thickness of about 14 μm. A transparent material luminance test was performed and the result is shown in Table 1.

Comparative Example 1-1

21.0 g acrylic resin [Eterac 7363-ts-50, Eternal Company] (with a solids content of about 50%) was added into a plastic bottle. Then, 6.0 g methyl ethyl ketone, 6.0 g toluene, and 48 g 1~100 nm titanium dioxide solution (with a solids content of about 50%) were added sequentially under a high speed stirring. Finally, 2.0 g curing agent [Desmodur 3390, Bayer Company] (with a solids content of about 75%) was added. As such, a coating with a solids content of about 42% and a total weight of about 111.0 g was obtained. The coating was coated on a PET substrate [T680E100, made by Mitsubishi company] by a RDS painting stick #12, and then dried at 120° C. for 1 minute to obtain a coating film of about 7 μm. A transparent material luminance test was performed and the result is shown in Table 1.

Test Method:

Transparent material luminance test: measuring the haze (Hz) and total light transmittance (Tt) with NDH 5000W haze meter (Nippon Denshoku Industries Co., Ltd.) in accordance with the JIS K7136 standard method.

TABLE 1

|  | Hz (%) | Tt (%) |
| --- | --- | --- |
| Example 1-1 | 98.20 | 91.72 |
| Example 1-2 | 99.55 | 75.05 |
| Example 1-3 | 99.15 | 83.86 |
| Comparative Example 1-1 | 9.41 | 84.17 |

Example 2-1

After standing for 7 days, the coating film of Example 1-1 was subjected to a weathering test and the result is shown in Table 2.

Example 2-2

After standing for 7 days, the coating film of Example 1-2 was subjected to a weathering test and the result is shown in Table 2.

Example 2-3

Figure 5:
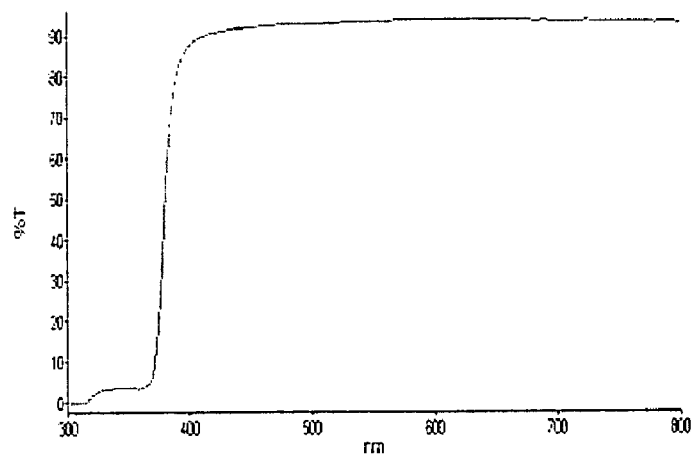
FIG. 5 shows a transmittance spectrum of UV-visible light for Examples 2-3.

21.0 g acrylic resin [Eterac 7363-ts-50, Eternal Company] (with a solids content of about 50%) was added into a plastic bottle. Then, 38.0 g methyl ethyl ketone, 38.0 g toluene, 24 g silicone resin powder with an average particle size of 2 μm [Tospearl 120E, GE Toshiba Silicones Company] and 48 g 1~100 nm titanium dioxide and zinc oxide solution (with a solids content of about 50%) were added sequentially under a high speed stirring. Finally, 2.0 g curing agent [Desmodur 3390, Bayer Company] (with a solids content of about 75%) was added. As such, a coating with a solids content of about 35% and a total weight of about 171.0 g was obtained. The coating is coated on a PET substrate [T680E100, Mitsubishi Company] by a RDS painting stick #12, and then dried at 120° C. for 1 minute to obtain a coating film of about 7 μm. After standing for 7 days, the coating film was subjected to a weathering test and the result is shown in Table 2. Moreover, the transmittance spectrum of UV-visible light was obtained and is shown in FIG. 5.

Example 2-4

21.0 g acrylic resin [Eterac 7363-ts-50, Eternal Company] (with a solids content of about 50%) was added into a plastic bottle. Then, 18.0 g methyl ethyl ketone, 18.0 g toluene, 36 g silicone resin powder with an average particle size of 2 μm [Tospearl 120E, GE Toshiba Silicones Company], and 48 g 1~100 nm titanium dioxide/aluminium oxide/zirconia solution (with a solids content of about 50%) were added sequentially under a high speed stirring. Finally, 2.0 g curing agent [Desmodur 3390, Bayer Company] (with a solids content of about 75%) was added. A coating with a solids content of about 49% and a total weight of about 143.0 g was obtained. The coating was coated on a PET substrate [T680E100, Mitsubishi Company] by a RDS painting stick #12, and then dried at 120° C. for 1 minute to obtain a coating film of about 7 μm. After standing for 7 days, the coating film was subjected to a weathering test and the result is shown in Table 2.

Test Method:

Weathering test: Irradiating a coating film with a QUV weathering tester (Q-panel Company), and measuring the changes in yellowing index (YI) values with a color difference meter ColorQuest XE (HUNTERLAB Company). The main wavelength in the weathering test was 313 nm.

Test on transmittance of UV-visible light: measuring the transmittance with a Lamda 650S UV-visible spectrophotometer (Perkin Elmer Company), and adopting an integrating sphere of 60 mm as a detector with a test wavelength of between 300 nm and 800 nm.

TABLE 2

| | Exposure 100 hr ΔYI | Exposure 200 hr ΔYI | Exposure 300 hr ΔYI |
|---|---|---|---|
| Example 2-1 | 4.96 | 8.76 | 11.26 |
| Example 2-2 | 5.63 | 10.25 | 14.63 |
| Example 2-3 | 0.6 | 0.8 | 0.9 |
| Example 2-4 | 0.8 | 1.1 | 1.2 |

Example 3

Preparation of Coating A: 21.0 g acrylic resin [Eterac 7363-ts-50, Eternal Company] (with a solids content of about 50%) was added into a plastic bottle. Then, 38.0 g methyl ethyl ketone, 38.0 g toluene, 24 g silicone resin powder with an average particle size of 2 μm [Tospearl 120E, GE Toshiba Silicones Company], and 48 g 1~100 nm titanium dioxide/zirconia/aluminium oxide/zinc oxide solution (with a solids content of about 50%) were added sequentially under a high speed stirring. Finally, 2.0 g curing agent [Desmodur 3390, Bayer Company] (with a solids content of about 75%) was added. As such, a coating with a solids content of about 35% and a total weight of about 171.0 g was obtained.

Example 3-1

The coating was coated on a PET substrate [T680E100, Mitsubishi Company] by a RDS painting stick #20, and then dried at 120° C. for 1 minute to obtain a coating film of about 14 μm. A transparent material luminance test was performed and the result is shown in Table 3.

Example 3-2

Coating A was coated on a PET substrate [T680E100, Mitsubishi Company] by a RDS painting stick #18, and then dried at 120° C. for 1 minute to obtain a coating film of about 12 μm. A transparent material luminance test was performed and the result is shown in Table 3.

Example 3-3

Coating A was coated on a PET substrate [T680E100, Mitsubishi Company] by a RDS painting stick #16, and then dried at 120° C. for 1 minute to obtain a coating film of about 10 μm. A transparent material luminance test was performed and the result is shown in Table 3.

Example 3-4

Coating A was coated on a PET substrate [T680E100, Mitsubishi Company] by a RDS painting stick #14, and then dried at 120° C. for 1 minute to obtain a coating film of about 8 μm. A transparent material luminance test was performed and the result is shown in Table 3.

Comparative Example 3-1

A commercially available diffusion plate (PC-8311, Teijin Chemicals company) with a thickness of 2 mm was subjected to the transparent material luminance test. The result of the test is shown in Table 3.

Comparative Example 3-2

A commercially available diffusion plate (PC-8391, Teijin Chemicals Company) with a thickness of 2 mm was subjected to the transparent material luminance test. The result is shown in Table 3.

Comparative Example 3-3

A commercially available diffusion plate (703, Chi Mei Company) with a thickness of 2 mm was subjected to the transparent material luminance test. The result is shown in Table 3.

Comparative Example 3-4

A commercially available diffusion plate (DSX70, Asahi Kasei Chemicals Company) with a thickness of 2 mm was subjected to the transparent material luminance test. The result is shown in Table 3.

TABLE 3

| | Hz (%) | Tt (%) |
|---|---|---|
| Example 3-1 | 99.74 | 64.94 |
| Example 3-2 | 99.67 | 68.58 |
| Example 3-3 | 99.54 | 80.90 |
| Example 3-4 | 99.18 | 81.25 |
| Comparative Example 3-1 | 99.67 | 63.79 |
| Comparative Example 3-2 | 99.64 | 64.17 |
| Comparative Example 3-3 | 99.51 | 70.88 |
| Comparative Example 3-4 | 99.13 | 74.70 |

It is clear from the results of Example 1-1 and Example 1-2 that the haze can be increased by applying a resin coating layer on the surface of the substrate to increase the number of organic particles, thereby achieving a better light diffusion effect.

It is clear from the results of Example 1-1 and Example 1-3 that when both surfaces of the substrate are provided with resin coating layers, the thickness of the coating layers and the number of organic particles increase, so as to effectively shade the strong light source and achieve a better diffusion effect.

It is clear from the results of Example 1-1 and Comparative Example 1-1 that a coating layer without a convex-concave structure has a low haze due to the lack of organic particles, and does not have a desired light diffusion effect.

It is clear from the results of comparing Example 2-1, Example 2-3, Example 2-2, and Example 2-4 that when the resin coating layer applied on the surface of the substrate comprises an inorganic substance capable of absorbing UV light, the resin coating layer has a good anti-yellowing effect, and thus can provide a UV light resistant property. It is apparent from FIG. 5 that the layer can absorb UV light because the transmittance of UV light at a wavelength smaller than 380 nm is less than 5%, while the transmittance of visible light at a wavelength between 400 nm and 780 nm is more than 90%.

It is clear from the result of comparing Example 3-1 with Comparative Examples 3-1 to 3-4 that the optical thin sheet of the present invention has a higher haze than a commercially available optical thin sheet, and thus, the optical thin sheet of the present invention has a relatively high diffusion property for achieving a uniform brightness effect.

It is clear from the results of comparing Example 3-1 with Comparative Example 3-1, Example 3-2 with Comparative Example 3-2, Example 3-3 with Comparative Example 3-3, and Example 3-4 with Comparative Example 3-4 that, when the optical thin sheet of the present invention has a haze equal to or higher than that of a commercially available optical thin sheet, the optical thin sheet of the present invention has a relatively high total light transmittance, and thus provides a higher brightness.

It is clear from the results of comparing Example 3-1 with Comparative Example 3-1, Example 3-2 with Comparative Example 3-2, Example 3-3 with Comparative Example 3-3, and Example 3-4 with Comparative Example 3-4 that, the optical thin sheet of the present invention has a haze higher than that of a commercially available optical thin sheet, and its thickness is only one-tenth of that of the commercially available optical thin sheet. Thus, the optical thin sheet of the present invention will significantly reduce the thickness and weight of the obtained module, and is industrially applicable.

The optical thin sheet of the present invention has a high light diffusion property and can be used to achieve a uniform brightness. Moreover, the optical thin sheet of the present invention is thin and light, so that it can replace the diffusion plate previously used in backlight modules.

What is claimed is:

1. An optical thin sheet comprising a plastic substrate having at least one side coated with a resin coating layer with a convex-concave structure, wherein the resin coating layer comprises silicone resin particles, a bonding agent, and an inorganic substance, in which the silicone resin particles have a diameter in the range from 1 μm to 10 μm and are in an amount of 150 to 600 weight %, based on the weight of the bonding agent, the inorganic substance is selected from the group consisting of titanium dioxide, zirconia, aluminum oxide, zinc oxide, and mixture thereof, the particle size of the inorganic substance is in a range of from 1 nm to 100 nm, and the optical thin sheet has a haze of no less than 98% as measured in accordance with the JIS K7136 standard method.

2. The optical thin sheet as claimed in claim 1, wherein the plastic substrate is selected from the group consisting of polyacrylate resin, polycarbonate, polystyrene resin, polycyclo-olefin resin, polyolefin resin, polycellulose acetate resin, polyimide resin, and polyester resin.

3. An optical thin sheet, comprising a polyester resin substrate having at least one side coated with a resin coating layer with a convex-concave structure, wherein the resin coating layer includes silicone resin particles, a bonding agent, and an inorganic substance, in which the silicone resin particles have a diameter in the range from about 1 μm to about 10 μm and are in an amount of 150 to 600 weight %, based on the weight of the bonding agent, the inorganic substance is selected from the group consisting of titanium dioxide, zirconia, aluminum oxide, zinc oxide, and a mixture thereof, the particle size of the inorganic substance is in a range of from 1 nm to 100 nm, and the optical thin sheet has a haze of no less than 99% as measured in accordance with the JIS K7136 standard method.

4. The optical thin sheet as claimed in claim 3, wherein the optical thin sheet has a total light transmittance of no less than 60% as measured in accordance with the JIS K7136 standard method.

5. The optical thin sheet as claimed in claim 3, wherein the polyester resin is poly(ethylene terephthalate) or poly(ethylene naphthalate).

6. The optical thin sheet as claimed in claim 3, wherein the bonding agent is selected from the group consisting of acrylic resin, polyamide resin, epoxy resin, fluoro resin, polyimide resin, polyurethane resin, alkyd resin, polyester resin, and a mixture thereof.

7. The optical thin sheet as claimed in claim 3, wherein the particles are in an amount of 150 to 500 weight % based on the weight of the bonding agent.

8. The optical thin sheet as claimed in claim 3, wherein the resin coating layer has a thickness between 1 μm and 50 μm.

9. The optical thin sheet as claimed in claim 8, wherein the resin coating layer has a thickness between 1 μm and 20 μm.

10. A complex optical thin sheet, comprising an optical thin sheet as claimed in claim 1, wherein the other side of the substrate has a brightness enhancing layer capable of enhancing brightness.

11. The optical thin sheet as claimed in claim 10, wherein the brightness enhancing layer has a microstructure.

12. The optical thin sheet as claimed in claim 11, wherein the microstructure is selected from the group consisting of a regular or an irregular prism pattern, a rounded prism pattern, a solid angle pattern, a bead pattern, and a lenticular pattern.

13. A complex optical thin sheet, comprising an optical thin sheet as claimed in claim 1, wherein the other side of the substrate has a diffusion layer capable of diffusing light.

14. The optical thin sheet as claimed in claim 13, wherein the diffusion layer comprises one or more kinds of scattering particles with different diameters ranging from 1 μm to 50 μm.

* * * * *